T. S. PEARSON & T. M. CONNER.
BALING MACHINE.
APPLICATION FILED JAN. 19, 1914.
1,100,906.
Patented June 23, 1914.
5 SHEETS—SHEET 1.
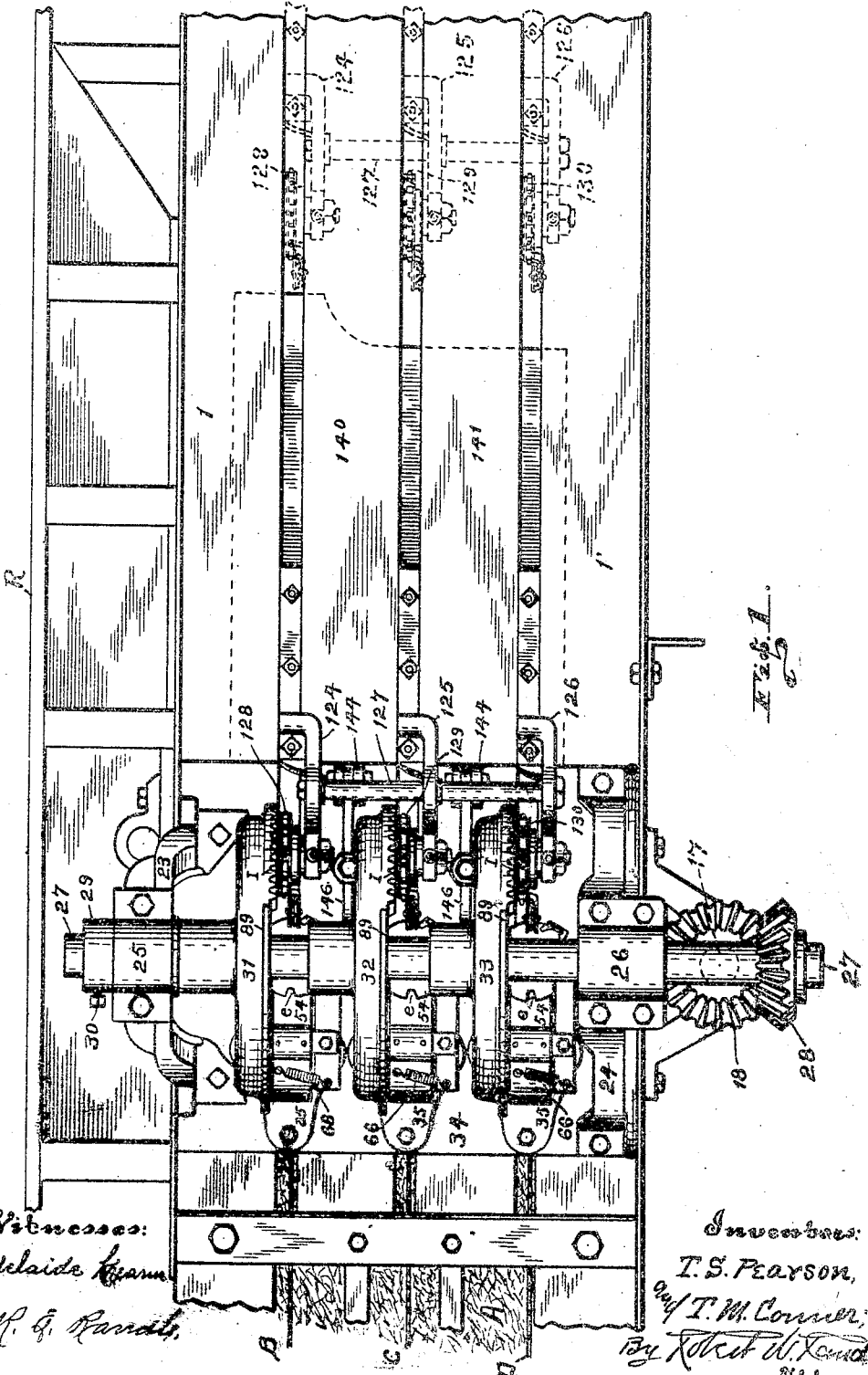

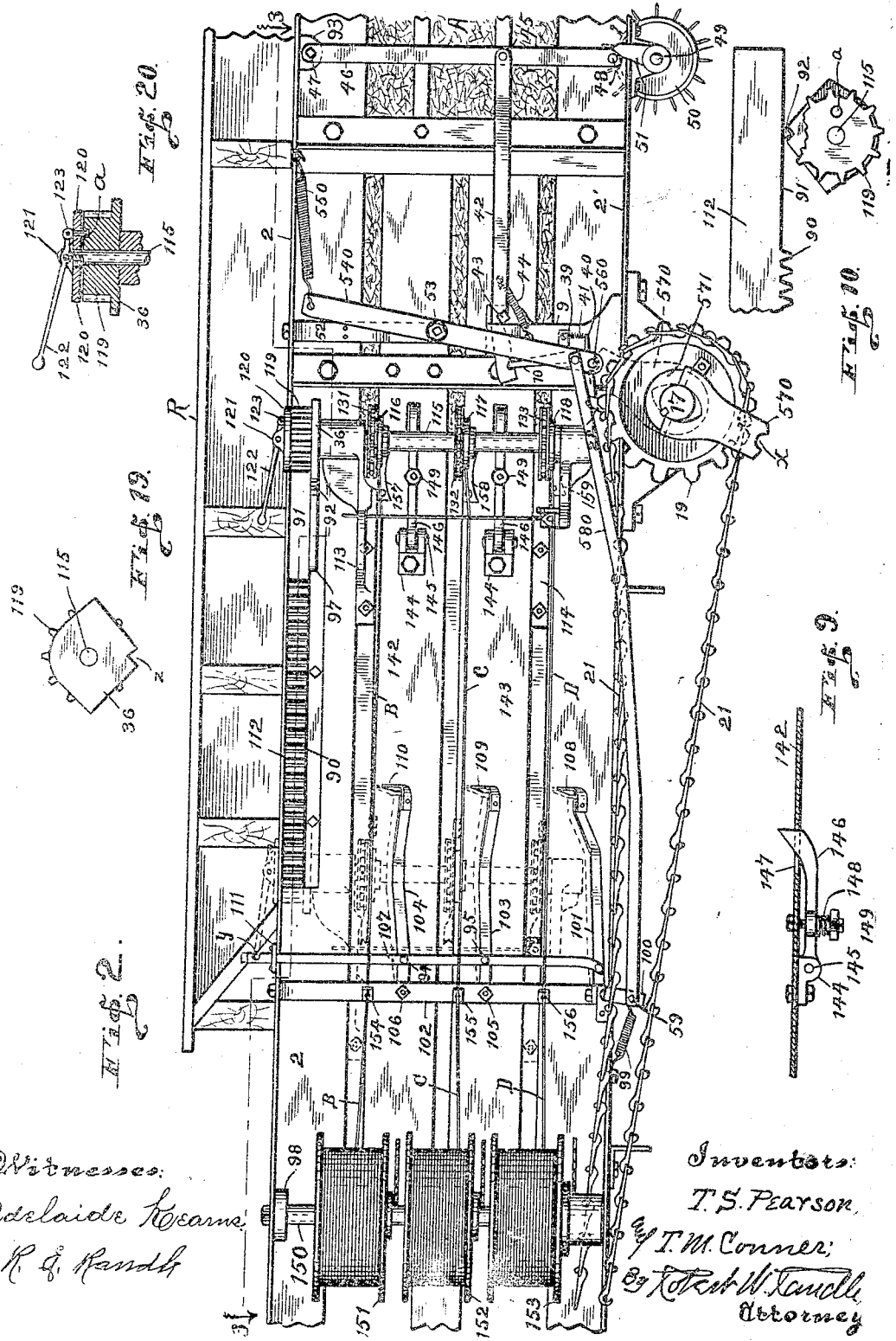

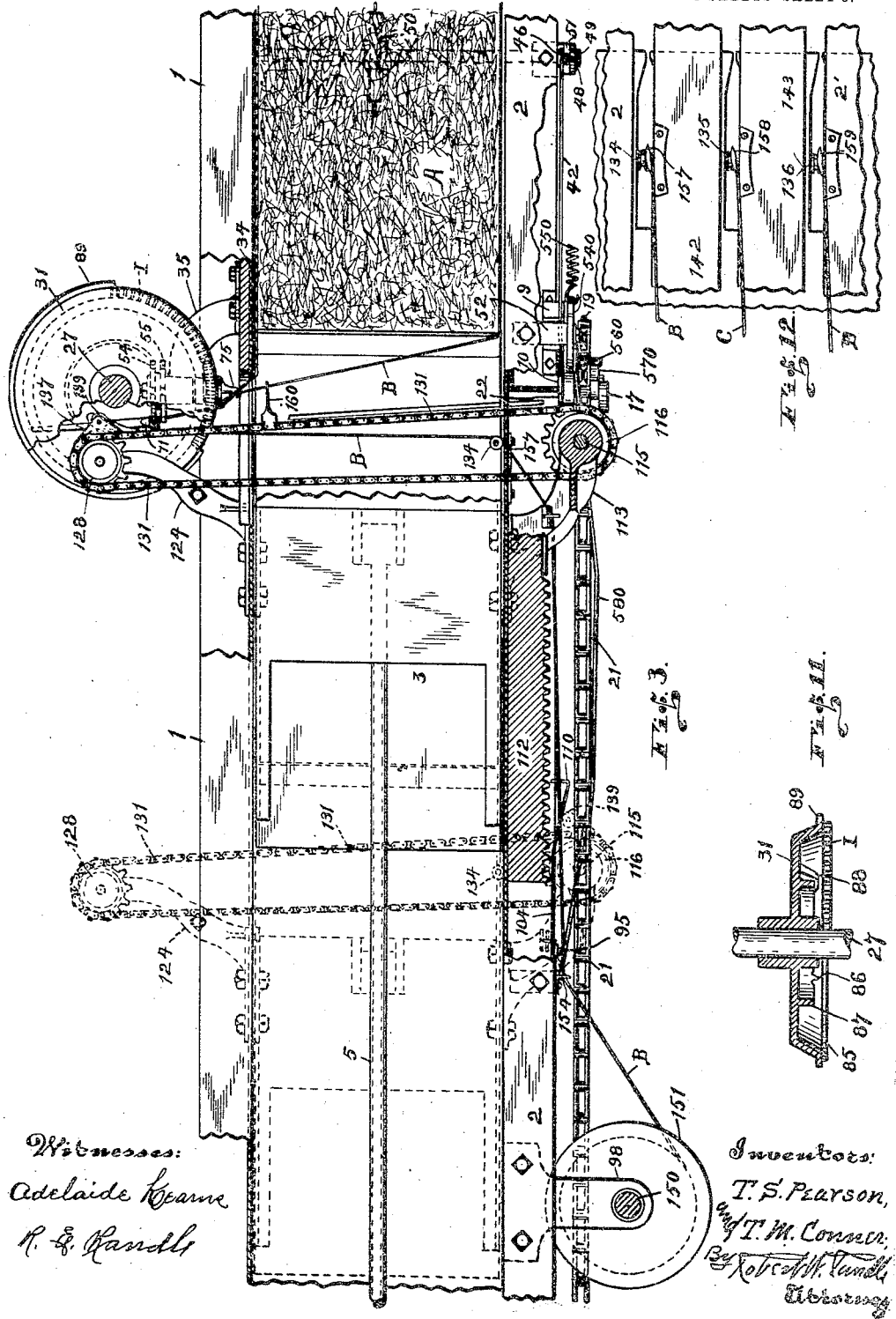

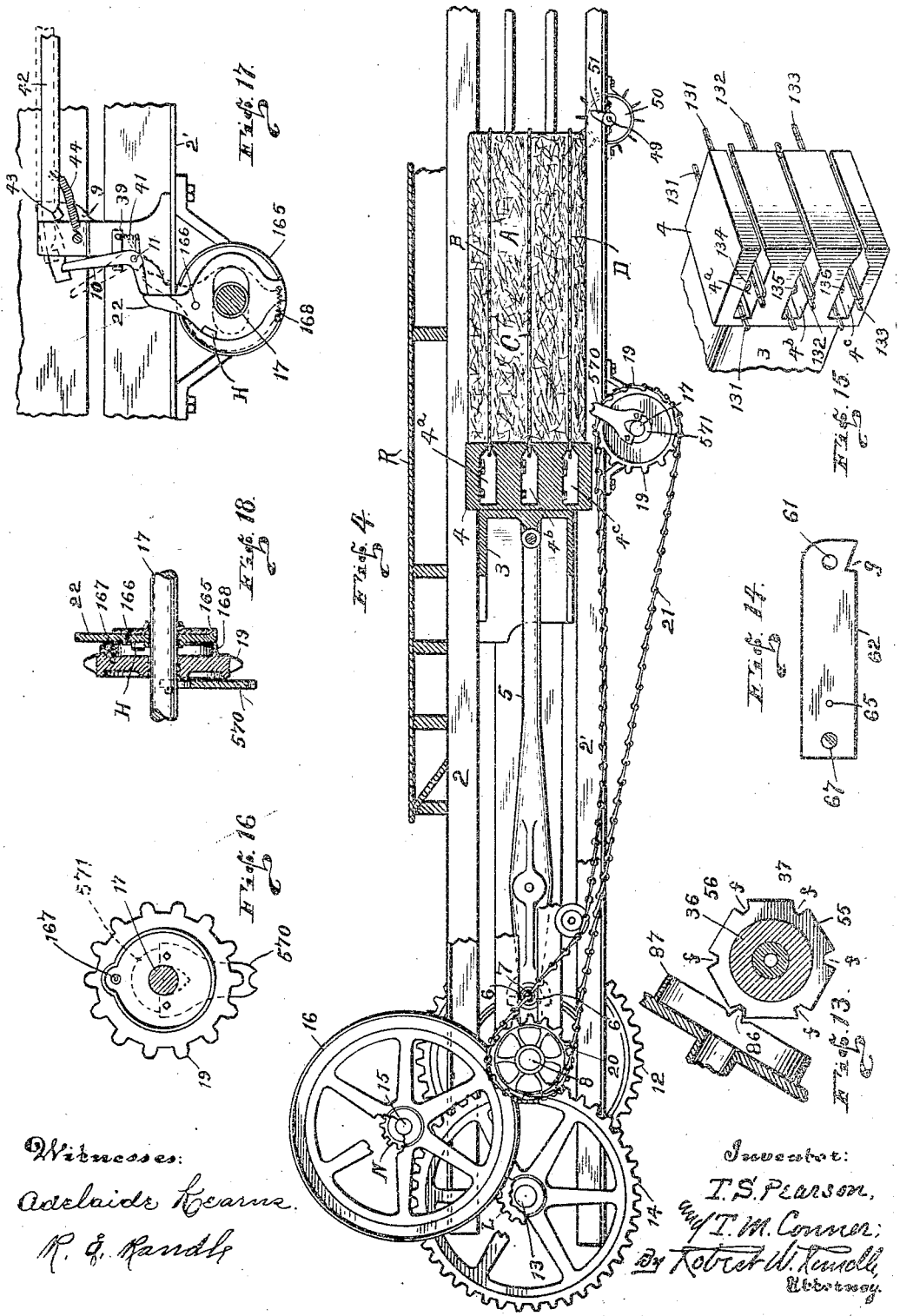

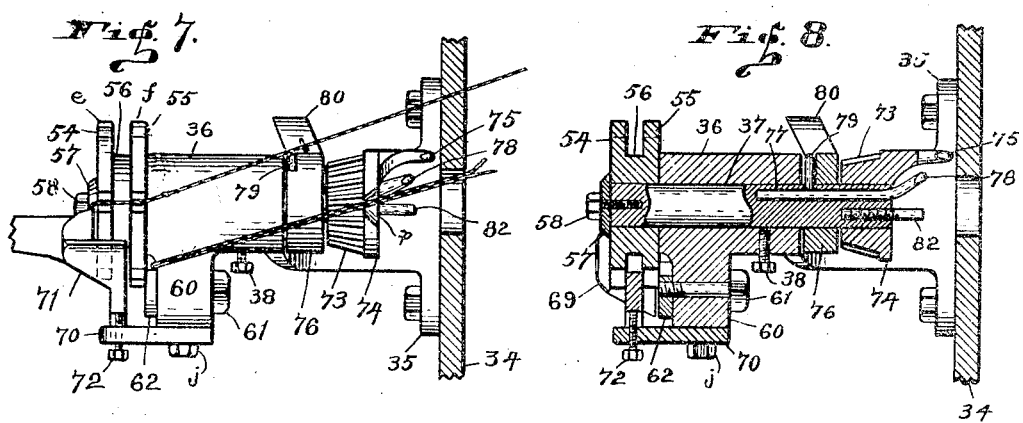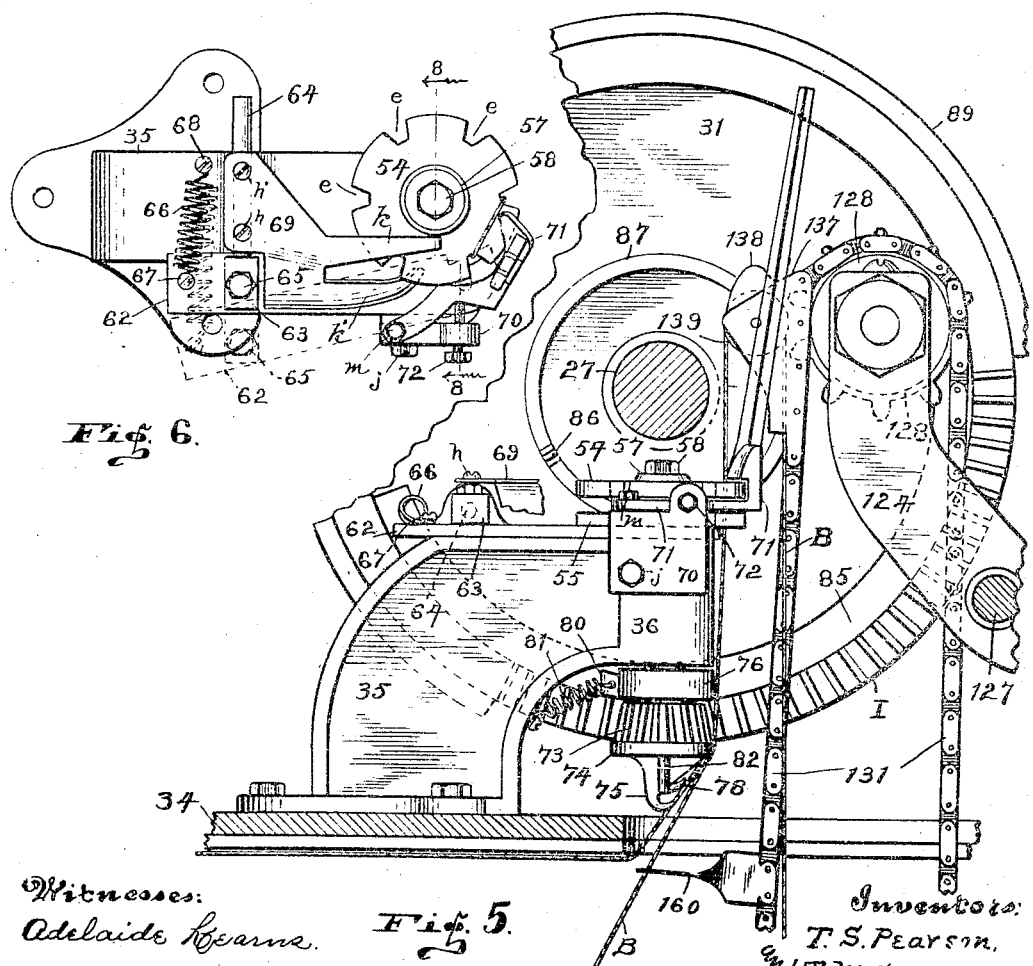

UNITED STATES PATENT OFFICE.

THOMAS S. PEARSON AND THEODORE M. CONNER, OF KOKOMO, INDIANA, ASSIGNORS OF ONE-THIRD TO JOHN B. DOUGAN, OF RICHMOND, INDIANA.

BALING-MACHINE.

1,100,906.   Specification of Letters Patent.   Patented June 23, 1914.

Application filed January 19, 1914. Serial No. 813,137.

*To all whom it may concern:*

Be it known that we, THOMAS S. PEARSON and THEODORE M. CONNER, citizens of the United States, residing at Kokomo, in the county of Howard and in the State of Indiana, have invented a new and useful Construction in Baling-Machines, of which the following is a full, clear, and accurate specification, being such as will enable others to make and use the same with exactitude.

Our present invention has reference to a mechanism for compressing and baling various kinds of materials which are susceptible thereto, such for instance, as hay, straw, cotton et cetera, which hereinafter will be referred to as the material.

The object of our present invention, broadly speaking, is to provide a baling-machine which will be strong and durable in construction, automatic in its several operations, positive in its various movements, easily operated and controlled, and which can be manufactured and sold at a comparatively low price.

More particularly stated, our object is to provide various new instrumentalities, a rearrangement of various elements, and a general improvement of the construction and operation over that set forth in Letters Patent No. 1,075,376, issued to us October 14, 1913.

The particular object in view in this present invention is the provision of means for carrying the binding wires across the last completed end of the bale of material without the employment of needles or the like, whereby the work is accomplished more positively and without danger of breakage in the wire or in the mechanisms of the machine.

Other objects and particular advantages of our invention will be made apparent in the course of the following specification.

The preferred means for carrying out the principles of our invention in a practical manner is shown in the accompanying drawings, in which—

Figure 1 is a right-hand side elevation of the central portion of our machine. Fig. 2 is a left-hand side elevation of the central portion of our machine. Fig. 3 is a top plan view of the central portion of our machine. Fig. 4 shows the front portion of our machine, the left-hand part of said view shows an elevation of the driving elements and the right-hand portion thereof being a vertical section of certain of the parts. Fig. 5 is an enlarged detail view of one of the twister mechanisms. Fig. 6 is a top plan view of one of the three twister mechanisms. Fig. 7 is an elevation of one of the twisters. Fig. 8 is a vertical section taken through one of the twisters, the same being taken on line 8—8 of Fig. 6. Fig. 9 is a detail plan view of one of the chockers for the bales being formed by the machine. Fig. 10 is a detail plan view of the rack and pinion mechanism. Fig. 11 is a central cross section taken through one of the twister-wheels. Fig. 12 is a detail side elevation showing the three hooks by which the baling-wires are directed across the baling chamber. Fig. 13 is a detail of one of the twisters, partly in section taken between the two disks of one of the twisters. Fig. 14 is a plan view of one of the three knives which are associated with the twisters. Fig. 15 is an isometrical detail view of the guide-block and a portion of the plunger. Fig. 16 is an inside face view of one member of the clutch. Fig. 17 is an outside face view of the clutch and the parts which operate thereon and in connection therewith. Fig. 18 is a cross section taken through the clutch. Fig. 19 is a plan view of the cam-plate which is integral with the lower end of the pinion. And Fig. 20 is a vertical section of the pinion of the plate shown in Fig. 19.

Similar indices denote like parts throughout the several views.

The frame of our machine includes the four beams, formed of angle iron, the same being spaced apart and located parallel with each other, and they comprise the two beams 1 and 1', upper and lower, on the right; and the two beams 2 and 2', upper and lower, on the left. The rear portion of the inclosure formed by said beams, which are rigidly connected together, provides a compression or bale forming chamber, while the forward portion provides the plunger operating chamber.

The space between the beams 1 and 1' is partially closed by the two horizontal side-plates 140 and 141 which extend the full length of the piston chamber, with spaces therebetween and they are spaced from the beams 1 and 1'. Likewise the space between the beams 2 and 2' is partially closed by the two horizontal side-plates 142 and 143 which also extend the full length of the piston chamber, with spaces therebetween and they are spaced from the beams 2 and 2', substantially as and for the purpose appearing.

Letter A denotes a bale of material located in the compression chamber, which bale may be fully or partly completed. Mounted to reciprocate horizontally in the piston chamber is the plunger 3. Secured on the rear end of the plunger is the guide-block 4, whose function will be explained hereinafter. Said plunger is adapted to be reciprocated by the pitman 5. The forward end of said pitman is pivoted to the crank 6 by means of the crank-pin 7. The crank 6 is carried by the wheel 12 (which wheel may be double) and the same is mounted on the shaft 8. Supported in front of the shaft 8 is the shaft 13 on which is secured the intermediate gear wheel 14. Mounted on suitable brackets extending up from the frame of the machine is the shaft 15 on which is secured the drive-wheel 16. A pinion L is secured on the shaft 13 and it meshes with the gear-wheel 12. Also a pinion N is secured on shaft 15 and it meshes with the gear-wheel 14.

Extending across and suspended below the frame of the machine, and located near the forward end of the compression chamber, is the shaft 17. Secured on the right-hand end of the shaft 17 is the free sprocket-wheel 19, which is located in alinement with sprocket wheel 20, the latter being secured on the shaft 8. Connecting the sprocket-wheels 19 and 20 is the sprocket-chain 21. The sprocket-wheel 19 is adapted to carry the shaft 17 revolubly by means of a clutch, which is similar to that shown in our prior patent.

Secured to the outer faces of the beams 1 and 1' are the brackets 23 and 24 which carry the respective boxings 25 and 26, the same being located in vertical alinement with each other. Revolubly mounted in said boxings is the shaft 27, which is in alinement with but located at right-angles to the shaft 17. Secured on the lower portion of shaft 27 is the bevel-gear 28 which meshes with the bevel gear 18 and it is driven thereby. Said shaft 27 is retained in position, as to vertical movements, by the collar 29 which is adapted to be secured to the shaft 27 by the set-screw 30, said collar being adapted to rest on the boxing 25, as shown in Fig. 1.

Spaced a proper distance apart and secured on the shaft 27 are the three inverted-dish-shaped cam or twister-wheels 31, 32 and 33 which are identical with each other. Extending around a portion (usually one-half) of the lower face of the periphery of each twister wheel is a gear I. In referring further to the twister-wheels it will be necessary to mention only one, for instance the one indicated by numeral 31. Also as there are three twister mechanisms which are identical with each other, operated by the respective twister wheels, it will be necessary to refer to only one of them and the like parts in the others will be denoted by like indices.

Extending vertically and secured to the beams 1 and 1' is a plate 34 to which the three twister mechanisms are secured, the same being spaced according to that of the twister-wheels. Each of the said twisters includes an angular base 35, the projection of which is toward the front of the machine. Formed integral with the forwardly extending end of the base 35 is the head 36, which extends horizontally and in alinement with the cross section of the machine. Extending through the head 36 is the core 37 which is adjustable, and it is round in cross section, and it is secured in place by the set-screw 38. Revolubly mounted on the outer extension of the core 37, and in contact with the head 36, is the spool-shaped member, comprising an upper or cincher-disk 54, and the lower or cutter-disk 55, the two disks being spaced apart but integrally connected by the stem 56. Said spool member is retained in position by the washer 57 and the screw 58. Formed in the periphery of the disk 54 are a plurality of square notches e which are spaced the same distance apart with relation to each other. In the periphery of disk 55 are a plurality of notches f, being the same in number and each located in alinement with one of said notches e. The periphery of disk 54 forms a true circle, except for the notches e, while the periphery of disk 55 is formed by straight lines extending directly between each two of the notches f, for the purposes hereinafter made apparent.

Formed integral with and extending from one side of the head 36 is the projection 60. Extending through the projection 60, and parallel with the core 37, is the bolt 61, to the outer end of which is secured the knife 62. Said bolt 61 acts as the axis of the knife 62, allowing it to swing, for the purpose hereinafter stated. A notch g is formed on one edge of the knife and it is located near the bolt 61. Formed across the top of member 35 is a barrel 63 in which is slidably mounted the pintle 64, which acts as a guide for the knife and by which it is operated. One end of the pintle 64 is pivoted to the knife by the screw 65. The end of the knife opposite the notch g is retained normally in position by the spring 66, one end of which is secured to the knife by the screw 67, while the other end is secured to member 35 by the screw 68.

Numeral 69 denotes a plate which is secured to the top of the barrel 63 by screws $h$ and $h'$. Said plate has two fingers, $k$ and $k'$, the former extends over the disk 54 and the latter, which is turned at right-angles to the former, extends between the disks 54 and 55. Secured to the side of the projection 60, by the screw $j$ is the bracket 70. Extending over the knife 62 and pivoted to the bracket 70, by the screw $m$, is the cincher 71 whose free end extends around in front of the cincher disk 54 and it has a flat portion which extends in under the disk 54, and it is provided with a head portion which extends over said disk. It should be noticed that the cincher 71 is adapted to swing on its pivot $m$ and the swinging movement of the cincher may be limited or adjusted by the screw 72.

Revolubly mounted on the inner extension of the core 37 is the angular gear 73 which tapers outward. Formed integral with the inner end of gear 73 is the block 74, the three sides of which are square, the other being rounded. The inner face of block 74 is flush with the inner end of the core 37, there being a notch $p$ formed in one part of the periphery of said block. Extending inwardly from the block 74, adjoining the side opposite to the rounded side of said block, and integral therewith, is the master hook 75, the same being located to one side of the center of the block 74.

Numeral 76 denotes a collar rotatably mounted on the inner extension of the core 37, and it is located between the head 36 and the gear 73. Rotatably mounted in the core 37, to one side of the center thereof, projecting beyond the collar 76, is the stem 77. Integral with the inner portion of said stem is the minor hook 78. Extending from the stem 77, at right angles thereto, is a finger 79, there being an aperture formed through the collar 76 in which said finger may loosely operate, by which as the collar is turned the stem will also be turned, thereby turning the hook 78.

Numeral 80 denotes a lug extending out from the collar 76 by which the collar may be turned. Attached to the lug 80 and to the member 35 is the spring 81, whose tension is such as to retain the hook 78 in its normal position. Extending inward from the inner end of the core 37, parallel with the stem 77, and located to one side of the center of the core, is the twister-pin 82.

The various movements of the twisters are each controlled by its cam or twister-wheel 31, 32 and 33, heretofore mentioned. The gear $I$, for instance, operates on the gear 73 and the block 74 during only a part of the time the twister wheel is making a revolution, and during this time the gear 73 is being revolved then the hook 75 is carried around concentric with the core 37, which latter always remains stationary.

Formed around on the inside of the twister wheels 31, 32 and 33, for instance as shown in Fig. 13, is the ring 87, whose edge is adapted to slide on the flat edge of the cutter-disk 55. A tooth 86 extends out from one point in the edge of the ring 87, said tooth being adapted to engage in the notches $f$ of the disk 55. Also a cam 88 extends down from within the wheel 31, near the ring 87, to engage the pintle 64 to cause the knife to close in shearing contact with the face of the disk 55. Formed on a portion of the periphery of the twister-wheel 31 is a cam 89. Also a cam 85 is formed around in the wheel 31 and it is located inward from the gear $I$, to engage the lug 80. Extending up from the beam 2', slightly rearward of shaft 17, is the standard 9, to which is pivoted, at 11, the angular dog 10 as shown in Fig. 17.

Numeral 39 denotes an angular stop secured to the standard 9, and it is adapted to prevent said dog from swinging forward beyond a predetermined position.

Numeral 40 denotes a pin or finger which extends back from the angle of the dog 10. Extending from the pin or finger 40 to the base of the stop 39 is a helical spring 41 which retains the dog 10 normally forward against the outwardly extending portion of the stop 39.

Numeral 42 denotes an arm whose forward portion is adapted to operate loosely in a slot in the upper portion of the standard 9. The forward end portion of the arm 42 is curved slightly downward, and a shoulder is formed in its under edge in which may rest the stud 43, the latter being carried by the standard 9. Also a notch having a square forward shoulder is formed in the under edge of the bar 42 to engage the upper point of the dog 10. Said arm 42 is adapted to be moved forward and backward, and it is normally retained in its forward position by the helical spring 44, the same being attached to said arm and then extended forward and attached to the standard 9. Said arm 42 is pivoted at its rear end, by pivot 45, to the vertical bar 46. The upper end of the bar 46 is pivoted at 47 to the hanger 93 which is attached to the beam 2. The bar 46 extends downward to near the lower edge of the beam 2'. Extending out from the lower portion of the bar 46 is the pin 48.

Extending crosswise and suspended underneath the compression chamber is the shaft 49. Secured on shaft 49, near the lateral center of the compression chamber, is the feed-wheel 50, which has spurs or spikes projecting out from around its periphery, as indicated, which project up into the compression chamber to engage the bale A. Secured on the outer end of shaft 49 is the wiper-cam 51 which is adapted to impinge the pin 48 at each revolution of the wheel 50. A bracket 52 extends outward and downward from the beam 2, to which is pivoted, near its center at 53, the lever 540. Attached to the upper end of said lever is the spring 550 with its rear end attached, under tension, to the beam 2. Extending out from the lower portion of the lever 540 is the pin 560. Rigidly secured around the outer end of the shaft 17 is the collar 571 to which is attached the wiper-cam 570 whose extended portion is rounded with a notch $x$ therein to receive the pin 560.

Pivoted near the lower end of the lever 540 is the arm 580 which extends forward to where it is pivoted, at 59, to the eccentric or crank 100, and to the other end of said crank is pivoted the forward end of the rearwardly extending lifting-arm 101. Pivoted at its lower end to the forward portion of the arm 101 is the vertical bar 107 which projects up above the beam 2, and it operates through the guide 111, the latter being secured to the beam 2. Extending upward from the bearing of the crank 100, with its upper end secured to the beam 2, is the bracket 102.

Numerals 103 and 104 denote lifting-arms, which correspond in structure and operation with the arm 101, and they are pivoted at 105 and 106, respectively, to the bracket 102. At the intersections of the arms 103 and 104 with the bar 107 they are pivoted thereto by the pivots 94 and 95. Attached to the rear ends of the arms 101, 103 and 104, are the respective lifting plates 108, 109 and 110, which are adapted to lift the respective wires D, C and B at the proper time.

Secured to the beam 2 and extending along parallel with the outer face thereof is the rack bar 112. The major portion of the ..ter face of the rack-bar is provided with gear-teeth 90, while the rear portion of the ..ce of the rack-bar is provided with the smooth face 91, and near the rear end of the rack-bar is the single gear tooth 92, which latter is formed in the bar 97, the latter being secured to the under edge of the rack-bar 112.

*The traveling wire carriers.*—Extending out from the left-hand side of the plunger 3, through the spaces between the beams 2 and 2' and the plates 142 and 143, are the brackets 113 and 114 which curve rearward and carry the vertical shaft 115 on which latter is secured the three sprocket-wheels 116, 117 and 118 which are each located opposite an aperture in the side of the piston chamber. Revolubly mounted on the upper part of the shaft 115, in horizontal alinement with the rack-bar 112, is the pinion 119.

Numeral 120 denotes a disk resting on the pinion 119, and the said disk is rigidly secured to the shaft 115. Pivoted at 121 to the center of the disk 120 is the arm 122 which has an expanded outer end to engage in the notch $y$ of the bar 107. The inner or shorter end of the arm 122 is pivoted to the upper end of the pin 123 as shown. The said pin 123 is slidable up and down in an aperture extending down through the disk 120 and a corresponding hole or socket $a$ is formed in the body of the pinion 119, as shown in Fig. 20.

It should be understood that the pin 123 is at all times located in the socket $a$, except when the carrier is at the left and the end of the arm 122 engages in the notch $y$, then as the bar 107 moves down it is evident that the pin 123 will move up, and as the bar 107 moves up the pin 123 will be forced down to the position in which it is shown in Fig. 20, at which time the carrier will move to the right and therefore the arm 122 will move away and can not again engage in the notch $y$ until it again returns to the left. From this it is apparent that the clutch shown in Fig. 20 will remain in engagement all the time, except the brief interval when the pin 123 is held up by the bar 107, which is the time the carrier remains stationary. The arm 122 is rather tightly mounted on its pivotal connection, whereby it is caused to remain in any position where it is left by the movements of the bar 107.

Formed integral with the lower end of pinion 119 is the plate 96, which has a notch $z$ in one portion of its periphery. Carried on the lower edge of the rear portion of the rack-bar 91 is the bar 97 in the face of which is the single tooth 92, above referred to, said tooth being adapted to engage in the notch $z$ at certain predetermined intervals. Extending out from the right-hand side of the plunger 3, through spaces between the beams 1 and 1' and the plates 140 and 141, is the brackets 124, 125 and 126 which project rearward and outward, and they are rigidly connected to the vertical standard 127.

Revolubly mounted on the outer end of the brackets 124, 125 and 126 are the respective sprocket-wheels 128, 129 and 130 which are of the same size and are horizontally in alinement with the respective sprocket-wheels 116, 117 and 118. Connecting the sprocket wheels 116 and 128 is the sprocket-chain 131. A like sprocket-chain 132 connects the wheels 115 and 129. And a like sprocket-chain 133 connects the wheels 118 and 130. Said chains 131, 132 and 133 extend across through the respective slots $4^a$, $4^b$ and $4^c$ of the guide-block 4. Mounted in the center of the left-hand end of said slots are the respective rollers 134, 135 and 136, around which the respective chains pass.

Connected in each of the chains 131, 132 and 133 is a wire carrying device, shown in Fig. 5, and as they are all identical with each other a description of one will answer for all: Secured on the underside of the chain 131, for instance, is a plate 137 with a second plate 138 located parallel therewith and spaced therefrom. Revolubly mounted between the said plates is the roller 139, shown in dotted lines in Fig. 5. The said roller has a channel in its periphery to receive the wire, as hereinafter explained. Also secured to each of the chains 131, 132 and 133, and located a short distance from the roller 139, for instance, is a finger 100 which has a notch in its free end to engage the wire, as hereinafter set forth.

A chocking device is carried by each of the plates 140, 141, 142 and 143, all of which are as that shown in Fig. 9, and a description of one will answer for all: Secured to the plate 140, for instance, is the member 144 to which is connected by the pivot 145 the finger 146 which curves inward and projects into the compression chamber through a slot 147 whereby the point of said finger will engage the bale should the bale incline to spring back toward the front of the machine after being compressed. The points of said fingers are retained resiliently in said slot by the spring 148 which is coiled around the bolt 149, the latter being secured to the plate 140, for instance, and it extends through an eye in the finger 146.

Carried by suitable brackets extending out from the beams 2 and 2', as for instance the bracket 98, is the stem 150, on which is freely mounted the three spools 151, 152 and 153, on which is wound the respective supply wires B, C and D.

Secured on the guide-bar 102 are the three eye-pieces 154, 155 and 156, through which the respective wires B, C and D pass. Secured on the upper edges of the side-plates 142 and 143, and on the upper edge of the beam 2', are the three hooks 157, 158 and 159, which are adapted to cause the respective feed wires B, C and D to extend straight across the compression chamber. The lower end of the crank 100 is normally retained in forward position by the helical spring 99, which is connected thereto and to the beam 2'.

The clutch above referred to, which is carried on shaft 17, is shown most clearly in Figs. 16, 17 and 18, and it includes the sprocket wheel 19 located on the left-hand side of the machine. Secured around the shaft 17, inwardly from the sprocket-wheel 19, is the clutch-case 165. Pivoted at 166 inside the case 165 is the dog 22, heretofore mentioned, which has an outwardly extending tooth adapted to impinge the dog 10, as shown in Fig. 17. Said dog 22 is adapted to swing on its pivot 166 substantially as indicated. Extending out in an axial direction from the peripheral portion of the face of the dog 22 is the lug H. Extending inwardly from the inner face of the sprocket-wheel 19 is the roller 167 which is adapted to engage the lug H when the dog swings in one direction and to be free therefrom when the dog swings in the opposite direction. The dog 22 is retained in its normal position by the helical spring 168, one end of which spring is attached to the dog 22 and the other to the case 165, substantially as indicated. Mounted on top of the machine is a platform or inclosed hopper R whose focal point leads into the forward end of the compression chamber and from which the material is fed thereto.

*Operation.*—In threading the machine the wire B, for instance, is drawn from the spool 151 and passed through the eye-piece 154, and from there through the hook 157, then across through the compression-chamber to the cincher 71 by which the wire is held. The wires C and D are also in like manner attached to their corresponding respective parts, as shown. The machine may now be started and the material may be placed in the hopper R and from there conducted into the compression-chamber. As the plunger moves forward it will force the material back into the compression chamber at each rearward movement thereof, during which time the wires B, C and D will pay-out from their spools, thereby causing the wires to be disposed around two sides and the rear end of the bale being formed, and during this time the arm 122 will be down, thereby placing the shaft 115 out of gear, the pinion 119 simply revolving idle back and forth on the rack 112. Now when the bale is of proper size, coincident with which the spike-wheel 50 will have made one revolution, it being rotated by the rearward movement of the bale, then the cam 51 will impinge the pin 48 thereby moving the arm 42 rearward which will raise the forward end of the arm 42, first pulling rearward on the dog 10 and then releasing said dog, thereby causing said dog to release the dog 22 and thereby swinging the dog 22 whereby the clutch will be placed in engagement, and then on the next revolution of the sprocket 19, which revolves continuously, the shaft 17 will be revolved therewith which of course will turn the cam 570 and will cause its outer end to strike the pin 560 and allowing said pin to engage in the notch *x* which will eventuate in pulling the lower end of the lever 540 rearward and therefore the bar 107 will be raised. Now just prior to the raising of the bar 107 the plunger will be at its forward limit of movement with the outer end of the arm 122 resting in the notch *y*, therefore as the bar 107 is moved upward the arm 122 will be raised therewith which will force the pin 123 down, thereby locking the pinion 119 to the plate 120. Now on the next forward movement of the plunger the shaft 115 will be revolved during the time the pinion 119 is in engagement with the gear teeth 90. Therefore the chains 131, 132 and 133 will travel through the slots in the guide-block 4. Coincident with the above the arms 101, 103 and 104 will raise slightly, thereby causing the plates 108, 109 and 110 to lift up on the respective wires B, C and D placing the wires in the line of travel of the respective rollers 139, and then as the carriers or rollers 139 come around they will engage their respective wires and will carry them through the slots in the block 4 and will deliver them to the respective twisters, in the manner shown in Fig. 5.

The revolving of the shaft 17 as above set forth will manifestly result in operating the various twister mechanisms as shown in Fig. 1, therefore as the wires are delivered to the twisters they will be engaged thereby, and the carriers will return, that is the plunger will move forward and the carriers (that is the wheels 139) will be carried back, by a reverse movement, to their original positions, that is to their positions as shown by dotted lines in Figs. 1 and 2. At this point the function of two parts should be noticed: The finger 160 engages the wire as it is projected across the compression chamber and assures its being properly placed in the twister, that is it acts as a guide and it also presses back on the wire causing the wire to properly engage with the twister hooks. Another feature is that as the wires are delivered to the twisters the chains 131, 132 and 133 will discontinue their revolutions at a certain time, by reason of the smooth face 91 upon which the pinion 119 will not revolve, thereby giving the twisters time to operate upon the wires, after which the tooth 92 will engage in the notch z which will again tighten the wires, as the final twists are being given, thereby providing the proper amount of slack wire. And immediately thereafter the tooth 92 again engaging in the notch z, as the plunger starts to move forward, will slightly slacken the wires. Immediately on the completion of the ties the plunger will be moving forward again and the wire-carriers will return to their original positions, that is to their forward limit of movement, at which time the bar 107 will be up and the end of the arm 122 will again rest in the notch y.

Coincidental with the last mentioned movement the main clutch (on shaft 17) will be released, the arm 580 will be forced forward, by the springs 550 and 99, which will eventuate in lowering the bar 107 thereby lowering the arm 122 and consequently throwing the shaft 115 out of commission, thereby discontinuing the operation of the wire carriers. Synchronously with the above it evident that the turning of shaft 17 will eventuate in the operation of the twisters, that is the wheel 31, for instance, will revolve which will cause the tooth 86 to engage in one of the notches f, thereby turning the disks 54 and 55 the distance of one notch, and during the balance of the revolution of the wheel 31 one of the flat faces of the disk 55 will slide on the edge of the ring 87, thereby preventing the disks from turning, except the distance between two notches, during one revolution of the wheel 31. During this time, just mentioned, there are two portions of wire located in one of the notches f, and disposed through its corresponding notch e; the portion held by the cincher and a portion delivered by the wire carrier as previously described. Therefore as the said disks are turned the two portions of wire, just mentioned, in notch f will be carried around thereby and they will be engaged by the cincher, and located in position to be engaged by the knife 62. The said two portions of wire meeting in notch f are in fact the termini of a length of wire surrounding the bale A. As soon as said double portion of wire are secured by the cincher then the cam 88 will engage the pintle 64, pressing it inward, and thereby actuating the knife 62 and causing it to close in shearing contact with the lower face of the disk 55, thereby severing the two portions of wire located in a notch f. However it should be observed that the cincher will continue to hold the wire which extends to the carriers and then to the spool, therefore as the disk has turned one space it will be seen that as the carrier moves away it will allow the supply wire to travel on the roller 139 but with the end still held by the cincher ready for a new bale to be formed.

It will now be noticed that the wire extending around the bale has two ends projecting through the eye formed by the hook 78 and the pin 82. Now the revolving of the pinion 73 will turn the hook 75 around therewith thereby causing the angular shoulder thereof to engage the free end portions of the wire which encircles the bale, causing them to slide down into the curved portion of the hook 75 and then as the last mentioned hook continues to revolve, the free end portions of the wire will be carried circuitously around-and-around the double portion of the wire located below the hook 78 thereby forming a loop and a twist. As soon as the twist has been formed by the hook 75 then the gear I will leave the pinion 73, thereby allowing the flat edge of the block 74 to slide on the face of the cam 89, thereby holding the hook 75. Simultaneous with the completion of the work of hook 75 as just stated, the cam 85 will release the finger 80 and allow the spring 81 to bring the collar 76 back to "rest" position, thereby swinging the hook 78 away from the pin 82. As the hooks 75 and 78 attain their "rest" positions then the tie will be free to slide off the pin 82, at which time the complete bale A is being ejected.

It should be understood that as the wires are delivered to the twisters they are carried therebeyond a proper distance whereby as the wire-carriers return they will leave a proper amount of slack wire with which to form the ties, without the necessity of the twisters pulling from the source of supply and without pulling the portions of the wires which surround the bale. In this instance we have shown our machine constructed to be entirely automatic in its several operations, but we would have it understood that we reserve the right to make certain changes therein whereby it will be semi-automatic, that is by simply dispensing with certain features and adapting certain parts to be operated manually, but without changing the principles of the invention. We also desire that it be understood that various changes may be made in the several details of construction, from that herein shown, without departing from the spirit of our invention and without sacrificing any of the advantages thereof.

The terms "upper", "lower", "forward", "backward", and other similar terms are used merely for convenience of description, but the construction and the operation of the machine is not to be limited by the employment of such terms.

Having now fully shown and described our invention and its operation, what we claim and desire to secure by Letters Patent of the United States, is—

1. In a baling machine having a bale-forming chamber and a plunger to reciprocate in said chamber, a guide-block secured to the face of the plunger, twister mechanisms located on one side of the machine, wire supply spools located on the side of the machine opposite to said twisters, wire carrying mechanism carried by the plunger and adapted to carry the wires across the forward end of the completed bale and deliver them to and beyond their respective twisters, and means operative coincident with the delivery of the wires to the twisters for operating the twisters to connect the ends of the wires which encircle the bale, substantially as set forth.

2. In a baling machine having a bale forming chamber and a plunger adapted to reciprocate therein, a guide-block carried by the face of the plunger, twister mechanism located on one side of the machine, wire supplying means located on the side of the machine opposite to said twisters, wire cutting means carried by each twister, wire carrying mechanisms carried by the plunger and adapted to deliver the wires across the forward end of a completed bale and deliver them to their respective twister mechanisms, and means whereby the twister mechanisms are operated to connect the ends of the wires which encircle the bale, substantially as set forth.

3. A baling machine having a bale forming chamber and a plunger adapted to operate therein, twister mechanisms located on one side of the machine, means for operating the twisters synchronously upon the completion of a bale formed in the bale-chamber, wire supply located on the side of the machine opposite to said twisters, wire carrying mechanisms carried by the plunger and adapted to carry the wires across the completed end of the bale, through apertures in said guide-block, and deliver them to their respective twister mechanisms, means for cutting off the wires which surround the bale to the proper lengths, means for uniting the ends of the wires which surround the bale by the operation of said twisters, and means carried by the twisters for holding the ends of the supply wires until a new bale is formed, substantially as set forth.

4. A baling machine having a bale-forming chamber and a plunger adapted to reciprocate therein, a guide-block carried on the face of the plunger, twister mechanisms disposed on one side of the machine, brackets extending laterally from the sides of the plunger through the sides of the chamber in which the plunger operates, sprocket wheels carried by said brackets, horizontally disposed sprocket-chains connecting the members of each pair of sprocket-wheels and extending across through slots in said guide-block, means carried by each of said sprocket chains for engaging a wire and carrying it across through the plunger chamber and delivering it to the twister mechanism, all substantially as set forth.

5. A baling machine having a bale-forming chamber and a plunger to reciprocate therein, a guide-block carried on the face of the plunger, twister mechanisms located on one side of the machine, wire supplies located on the side of the machine opposite to said twisters, brackets extending out through the sides of the plunger chamber and secured to the sides of the plunger, a vertical shaft located on one side of the machine, sprocket wheels carried by said shaft, corresponding sprocket wheels carried by the arms on opposite side of the machine, a sprocket chain connecting each pair of sprocket wheels and extending across through the plunger chamber through a slot in said guide-block, means carried by each of said sprocket chains for engaging a wire from the wire supply and carrying it across to the opposite side of the machine and delivering it to its respective twister mechanism, means for operating said sprocket chains in proper time, means for operating the twisters in proper time, and means for severing the wires after they have been engaged by their twister mechanisms, all substantially as set forth.

6. A baling machine having a bale-forming chamber and a plunger adapted to operate forward and backward therein, a guide-block fixed on the face of the plunger and having horizontal slots therethrough, twister mechanisms located on one side of the machine, brackets extending out from the sides of the plunger, sprocket wheels carried by the said brackets, horizontally disposed sprocket-chains carried by the said sprocket wheels and operative through their respective slots in said guide-block, a wire carrying device carried by each of said chains and including a roller around which its respective wire operates as the wire is being carried across through the plunger chamber and delivered to the respective twister mechanisms, and means whereby a period of inertia is given to said chains when the plunger is at its forward limit of movement, all substantially as shown and described.

7. In a baling machine having a bale chamber and a plunger chamber which are connected together, a piston operative in the plunger chamber and adapted to compress material placed in the bale chamber, wire uniting mechanisms located on one side of the machine at the juncture of the plunger chamber and the bale chamber, a cincher carried by each wire uniting mechanism, wire supplying means located on the side of the machine opposite to but forward of the wire uniting mechanisms, a wire carrying mechanism carried by the plunger and adapted to grasp the wires on the wire supplying side of the machine and carry them across through the bale chamber and deliver them to the cincher, means for severing the wires at predetermined points, and means for uniting the ends of each wire which surrounds the bale, all substantially as shown and described.

8. A baling machine having a bale forming chamber and a plunger adapted to operate forward and backward therein, a guide-block carried on the face of the plunger and having horizontal slots formed across its face, twister mechanisms located in vertical alinement on one side of the machine, wire supply spools located in vertical alinement on the opposite side of the machine, means for conducting the wires horizontally across through their respective slots in the guide-block, means carried by the twister mechanisms for holding the ends of the wires, and means carried by the plunger for engaging the wires on the wire supply side of the machine and carrying them across through the chamber and delivering each in a loop to its respective twister mechanism, and means for operating the twister mechanisms upon the completion of each bale, all substantially as shown and described.

9. In a baling machine having a chamber therein and a plunger operative in the chamber, the wire conveyers carried by the plunger and each comprising an endless chain adapted to travel through the chamber at right angles to the operation of the plunger, a wire carrying device carried by the chain for engaging a wire, drawing it from a source of supply, and delivering it on the opposite side of the machine from the source of supply, all substantially as shown and described.

10. In a baling machine having a chamber therein, a piston operative in the chamber, twister mechanisms located on one side of the machine, a cincher carried by each twister mechanism, wire supplies located on the other side of the machine, with the wires thereof extending into the chamber, then around three sides of the bale being formed, with their free ends held by the cinchers, a wire conveyer for each wire, the same being carried by the plunger, and each comprising an endless conveyer traveling through the baling chamber near the face of the plunger, wire carrying devices carried by the conveyers for engaging the wires on the wire supply side of the machine and carrying them across in loops through the baling chamber and delivering them to the tying means.

In testimony whereof we have hereunto subscribed our names to this specification in the presence of two subscribing witnesses.

THOMAS S. PEARSON.
THEODORE M. CONNER.

Witnesses:
B. C. MOON,
CORA M. WALL.